US009548566B2

(12) United States Patent
O'Connell et al.

(10) Patent No.: US 9,548,566 B2
(45) Date of Patent: Jan. 17, 2017

(54) ELECTRICAL FITTING AND SAFETY COVER AND METHOD OF USING SAME

(71) Applicants: Michelle Clare O'Connell, London (GB); Michael Ioannou, London (GB); Ian O'Connell, London (GB)

(72) Inventors: Michelle Clare O'Connell, London (GB); Michael Ioannou, London (GB); Ian O'Connell, London (GB)

( * ) Notice: Subject to any disclaimer, the term of this patent is extended or adjusted under 35 U.S.C. 154(b) by 288 days.

(21) Appl. No.: 14/088,415

(22) Filed: Nov. 24, 2013

(65) Prior Publication Data

US 2015/0143687 A1    May 28, 2015

Related U.S. Application Data

(63) Continuation of application No. 12/352,167, filed on Jan. 12, 2009, now Pat. No. 8,622,759, which is a (Continued)

(30) Foreign Application Priority Data

Aug. 9, 2000    (GB) .................................. 0019449.8

(51) Int. Cl.
*H01R 13/639*    (2006.01)
*H01R 43/18*    (2006.01)
(Continued)

(52) U.S. Cl.
CPC ........ *H01R 13/6397* (2013.01); *H01R 13/447* (2013.01); *H01R 13/453* (2013.01);
(Continued)

(58) Field of Classification Search
CPC . H01R 13/447; H01R 13/453; H01R 13/4532; H01R 13/4534; H01R 13/512; H01R 13/518; H01R 13/6397; H01R 13/652; H01R 43/18; H01R 43/20; H01R 24/78; H01R 2103/00; H01R 24/76; H02G 3/14; Y10T 29/49169; Y10T 29/49947; Y10T 29/49963; Y10T 29/49966; Y10T 29/49002

See application file for complete search history.

(56) References Cited

U.S. PATENT DOCUMENTS

| | | | | |
|---|---|---|---|---|
| 5,731,545 A | * | 3/1998 | Reed | H02G 3/14 174/66 |
| 6,007,353 A | * | 12/1999 | Webster | H02G 3/14 439/142 |
| 7,476,112 B2 | * | 1/2009 | O'Connell | H01R 13/652 439/133 |

FOREIGN PATENT DOCUMENTS

JP    2010272265 A  *  12/2010

* cited by examiner

*Primary Examiner* — A. Dexter Tugbang
(74) *Attorney, Agent, or Firm* — Waller Lansden Dortch & Davis, LLP; Larry W. Brantley (57) ABSTRACT

A method of connecting and using a safety cover for a socket that includes a front plate connected to a rear box using one or more screw-headed bolts includes the steps of loosening, but not removing, the one or more screw-headed bolts connecting the front plate to the rear box, moving the front plate outward away from the rear box so that a frame included with the safety cover can be slid onto the front plate, sliding the frame onto the front plate so that a lip included with the frame is disposed between the front plate and the rear box, and tightening the one or more screw-headed bolts so that the front plate is connected to the rear box with the lip from the frame gripped between the front plate and the rear box.

19 Claims, 8 Drawing Sheets

Related U.S. Application Data continuation of application No. 10/344,219, filed as application No. PCT/GB01/03575 on Aug. 8, 2001, now Pat. No. 7,476,112.

(51) Int. Cl.
    *H01R 13/453*    (2006.01)
    *H01R 13/512*    (2006.01)
    *H01R 13/447*    (2006.01)
    *H01R 24/78*    (2011.01)
    *H01R 43/20*    (2006.01)
    *H01R 13/518*    (2006.01)
    *H01R 13/652*    (2006.01)
    *H02G 3/14*    (2006.01)
    H01R 103/00    (2006.01)
    H01R 24/76    (2011.01)

(52) U.S. Cl.
    CPC ..... *H01R 13/4532* (2013.01); *H01R 13/4534* (2013.01); *H01R 13/512* (2013.01); *H01R 13/518* (2013.01); *H01R 13/652* (2013.01); *H01R 24/78* (2013.01); *H01R 43/18* (2013.01); *H01R 43/20* (2013.01); *H02G 3/14* (2013.01); *H01R 24/76* (2013.01); *H01R 2103/00* (2013.01); *Y10T 29/49002* (2015.01); *Y10T 29/49169* (2015.01); *Y10T 29/49947* (2015.01); *Y10T 29/49963* (2015.01); *Y10T 29/49966* (2015.01)

ELECTRICAL FITTING AND SAFETY COVER AND METHOD OF USING SAME

CROSS REFERENCE TO RELATED APPLICATIONS

This application is a continuation of U.S. patent application Ser. No. 10/344,219, subsequently issued on Jan. 13, 2009, as U.S. Pat. No. 7,476,112, which was a national stage entry under 35 U.S.C. §371 of PCT/GB01/03575, filed Aug. 8, 2001, which claims priority from United Kingdom patent application UK0019449.8, filed Aug. 9, 2000. The entire disclosures of the aforementioned patent applications are incorporated herein by reference.

FIELD OF THE INVENTION

This invention is concerned with safety covers, and relates in particular to a protective cover for a switch or a socket (and for a plug when in that socket) such as is used for providing electricity or a telephone, video or data connection.

BACKGROUND OF THE INVENTION

In modern electrical systems as used in houses, offices and other buildings, electricity is delivered by cabling to various points around the building at which there are electric sockets into which can be plugged the appliances to be used powered by the electricity supply, and switches to control the power to those sockets. Moreover, in a modern building there will be a technically similar system for providing communication channels—for telephone, television and computer. Each of the sockets will usually be of the type having an apertured terminal-carrying socket plate mountable on a recessed socket box itself flush mounted within a cavity in a wall. The apertures lead to the socket's terminals, disposed on the back of the plate and thus out of harm's way inside the box, and are shaped and sized to match the contact pins of the plug for which the socket is designed.

Another type of socket commonly encountered, especially in electric power circuits, is the "extension socket", a group of three or more individual sockets formed in a box-like carrier and all connected by a single lead to a plug that plugs into a single wall-mounted socket (in this way a single such wall socket can, within reason, be "converted" into a plurality of sockets). Such an extension socket device is normally the appropriate plurality of apertured terminal-carrying socket plates all mounted on a socket box; in principle, therefore, it is little different from a wall-mounted socket.

There are many reasons why it might be desirable to provide a cover over a socket, or over a plug when in place in that socket. One is that empty sockets seems to exert an irresistible fascination for small children, who will try to poke their fingers, their toys, or any available long thin object—such as a knitting needle or a screwdriver—into the plug pin apertures in the socket; when applying such investigatory skills to an electric socket a persistent and inventive child may well be successful, but sadly the reward for such success is all too often death by electrocution. A second reason is that much modern equipment is designed to be plugged in and left on and connected all the time—falling into this category are refrigerators, televisions (and video recorders) and Fax machines at one extreme, and computers (and their networks) and medical life support systems at the other—and sometimes it may be a minor disaster if the device is disconnected, unplugged or turned off (by, for example, a cleaner looking for a socket into which to plug a vacuum cleaner). The problem, as always, is how to achieve a cover that is both effective, securely hiding the switch, socket or plug from an inquisitive child or a careless cleaner, and yet also relatively easy for an authorized person to remove in order to access the plug, or the socket and its switch.

SUMMARY OF THE INVENTION

There are already many "solutions" to this problem, and some are indeed both convenient and effective. At its simplest, one such answer for an empty socket is to insert into it an imitation plug, with a shallow head that a child's fingers cannot easily grip. Such a solution does not help with the secondary problem of preventing a used socket being switched off, or having the plug removed from it, and to deal with that particular aspect there are available a number of box-like covers that can be secured over the plug-carrying socket so as to prevent access to the plug. However, none of these latter is especially convenient-or, sometimes, terribly effective—and it is an object of the present invention to provide an alternative version that is simpler and easier to use whilst at the same time providing the required secure protection. More specifically, for use with an apertured terminal-carrying plate mounted on a box (perhaps itself flush mounted within a cavity in a wall), the invention proposes a lockable cover having a frame mountable to the box—and in the case of a wall mounted box, to the wall around and behind the plate, a latchable cover panel hingedly secured to the frame so as completely to cover the switch or socket and any plug therein when closed, and key-operated locking means enabling the closed cover panel to be secured shut.

In one aspect, therefore, the invention provides a lockable cover, suitable for use with a switch or socket, and for any plug in the socket, of the type wherein an apertured terminal-carrying switch or socket plate is mounted on a switch-or socket-box, the cover having;

a frame mountable to the box, and extending behind the plate, and thus effectively between the plate and the box;

a plug-, switch-or socket-aperture-shrouding cover panel hingedly secured like a door to the frame, and swingable between a closed position, where it completely covers and encloses the switch or socket and any plug therein, and an open position, where it is clear therefrom, allowing access thereto;

latch means for holding the cover panel closed; and key-operated locking means enabling the cover panel to be secured, against opening, when in the closed position.

The cover of the invention is for the protection of switches and sockets (and plugs mounted therein). For simplicity hereinafter the term "socket" is used, where possible and where the context allows, to mean both an actual socket, such as a telephone, television, computer or electrical socket, into which a plug can be operatively inserted, and also a switch (it is common for certain electric systems, such as night-storage heater systems, to use switches which are physically much like a switched socket but without the socket parts). If a particular reference is necessary to switches, then it is given positively.

The socket to be "protected" by the cover of the invention may be of almost any technical and aesthetic design. More specifically, it may vary widely in its exact form—a standard chart produced by Interpower Components Ltd, of Bognor Regis, England, shows over 20 different electrical socket designs used throughout the world, ranging from 2-roundpin recessed devices used over most of continental Europe and Russia, through the 2-flat-strip US ones, the present-day UK "triangle" 3-square-pin ones, the triangle 3-round-pin Indian ones, 3-in-a-line-round-pin Italian ones and the triangle 2-strip-one-round Japanese ones, up to the proud triangle 3-angled-strip-pin sockets used in Argentina, Australia and China (the pin/aperture layouts for some of these are shown in the accompanying Drawings described hereinafter). All the known socket systems can be provided with a cover of the invention, though, like the sockets themselves, the covers are only superficially similar visually.

The socket being protected can be a wall-mounted socket, or it can be an extension socket arrangement, as discussed above. Indeed, it can be of any form provided it utilizes a front plate mounted on a rear box, effectively between the two of which there may be secured the cover frame (while in the case of an extension socket the plate is actually trapped between the plate and the box, in the case of a wall-mounted socket the frame may be trapped between the plate and the wall surface with which the box is flush).

The invention provides a lockable cover for a socket—that is to say, a cover which, when in place, will prevent prying fingers and other objects being poked into the socket's terminal apertures, and will prevent a plug in the socket being removed therefrom. As is discussed in more detail hereinafter, the cover is lockable—that is, when closed and in place it can be locked much as a door can be locked, and needs a key or key-like device to unlock it before it can be opened.

The cover of the invention is for a socket having an apertured terminal-carrying socket plate mountable on a socket box (typically such a box being recessed into and flush mounted within a cavity in a wall), the apertures leading to the socket's terminals disposed on the back of the plate and thus inside the box. It is usual for the plate to fit onto the box and be held there using a number of screw-headed bolts extending through the plate into threaded apertures near the periphery of the box.

Sockets often come in pairs—that is to say, two sets of plug-pin-receptors disposed side-by-side in a single but double-length socket plate (with matching socket box). Indeed, on occasion the socket might even be a triple socket (or more!). The cover of the invention may cater for this by having its frame matchingly sized, and by having its cover panel extending to cover all the socket-pin-hole sets.

The invention's cover has a frame mountable to the box (or to the wall)—that is to say, against and in contact with the box's/wall's surface, so leaving no significant gap through which an object might be poked into the socket. The frame extends around the socket plate, much as a picture frame extends around the picture; conveniently it matches the plate in shape and size, being just large enough to allow the plate to fit within it.

To permit the cover of the invention to be used with a plug-bearing socket it is necessary for there to be some means by which the plug's flex, lead or cord is enabled to extend out from the plug and away from the socket. This is most conveniently achieved by providing a suitable slot in that edge of the frame which will in use be on the side of the socket from which will project the lead of a plug, in the socket (this is usually the bottom edge, though obviously a socket can be installed any way up!). The slot can be simply wide enough to house the lead, or it can be the entire width of that side of the frame (so that the frame becomes a three sided rather than a four-sided object).

The cover's frame also extends behind the socket plate, and thus between the plate and the socket box. This latter extension is most conveniently effected by having an inwardly-directed lip on at least one, and preferably at least three, of the rear inner edges of the frame, which lip can fit between the plate and the box/wall. Indeed, this lip is preferably utilized not merely to locate the frame in place but also to hold it there; to position the frame the plate is first undone, and moved away from the box to allow the cover to be slipped over and around it, and is then re-attached to the box, trapping the lip between it and the box/wall, and thus holding the cover firmly in position.

It will be understood that as just described the cover can only be removed by first loosening off the socket plate—but that can only be done when the cover is open, which can only be achieved after it has been unlocked. Thus, when locked the cover is irremovable (except, perhaps, by the deliberate application of brute force).

On its side against which the panel fits the frame may have a low, upstanding perimeter wall which projects sufficiently to cover and so hide the actual touching faces of the frame and panel. This makes it harder for inquisitive fingers to poke themselves, or some other tool, into the socket between the panel and the frame.

The perimeter wall may conveniently be provided with a plurality of small, short web sections that extend inwardly from the wall so as to locate and grip the socket plate when the frame is disposed therearound.

The invention's cover includes a plug-or socket-aperture-shrouding cover panel hingedly secured like a door to the frame, and swingable between a closed position, where it completely covers and encloses the socket and any plug therein, and an open position, where it is clear therefrom, allowing access thereto. Though notionally the panel could be of any shape and size, most preferably it matches the socket it is to be used with, as does the frame. Thus, it will generally be roughly rectangular—square or oblong.

The cover's panel may, like the cover as a whole, be made of any convenient material—typically a plastic such as polyethylene or polypropylene. Most preferably, though, at least the area that overlies the socket's switches is made of a transparent material—PERSPEX®, for example—so that the state of the switches may easily be seen without first having to open the cover.

It is convenient if the cover's frame and panel be associated with a sealing gasket—preferably an appropriately-shaped "ring" of a rubber or some similar flexible insulating material—so that when the panel is shut it seals fairly tightly against the frame's surface, so assisting (with the frame's boundary wall) to keep both prying fingers and spilt liquids away from the plug. The gasket can be mounted in or on either of the frame and the panel, the former is preferred.

The panel's hinging may be accomplished in any convenient manner—using real, separate, hinges, say, or merely making the panel an integral part of the frame but joined thereto by some thin, flexible web of material that allows the panel to bend—to hinge—back and forth relative to the frame. One preferred way, though, is to mount the panel by way of pivot pins projecting out of it and into corresponding pivot holes in the frame, a conventional mounting type often utilized for the doors of refrigerators and microwave ovens.

The panel may be hinged anywhere along its periphery that is appropriate, A rectangular panel can be hinged on any of its sides, and while it may conveniently be so hinged on one of its (in-use) vertical sides, as is a conventional door, there may well be some advantage in hinging it along its in-use top edge, so that it opens upwards, away from the plug's lead (this facilitates inserting and extracting the plug).

The panel's hinging is preferably spring-loaded in the open sense, so that to close it the panel must be pushed shut against the force of the spring, while to open it the cover is merely unlocked, whereupon the panel automatically springs open.

The panel is swingable between a closed position, where it completely covers and encloses the socket and any plug therein, and an open position, where it is clear therefrom, allowing access thereto. There is little to say about this, save that if the panel is to be closable with the plug in the socket then clearly the panel must either be hung far enough away from the socket plate or be so shaped to provide room for the plug behind it. Were the frame to be sufficiently deep then it would extend away from the wall/socket box a distance greater than the depth of the plug, and then a cover panel mounted on the wall-distant surface of the frame would leave room for the plug behind it even when closed. However, a rather shallower, less bulky frame is preferred, in which case the panel needs to be shaped—with an outward bulge—to leave room for the plug. Any suitable shape may be employed—a "square box" shape, for example—but aesthetically it is preferable to provide the panel with a central domed portion wide and deep enough to accommodate the plug. Where the socket/plug to be covered is a double (or greater) socket, as mentioned hereinbefore, the shaped part of the panel may either be a single bulge extending sufficiently to overlay all the plug-pin holes, or—and preferably—it may have a number of separate bulges, one for each set of plug-pin holes.

Depending on the exact design of the frame and the cover panel, it may be desirable to provide the panel with an open slot through which there can project the lead of a plug in the socket on which the cover is being utilized, this slot allowing the panel to be opened and closed even when a plug is in place. If thought desirable, this slot can be fitted with a sealing grommet, of rubber or some similar flexible material, to form a tight fit with the lead and so leave no significant room for a child's prying fingers or a screwdriver.

The panel may, much like a real door, be designed to allow it if necessary or desirable to be removed and replaced—either if broken, say, or perhaps merely to match a different color scheme. One convenient way of achieving relatively simple replace ability is to ensure that whatever material the panel is made from—typically a plastic such as polyethylene or polypropylene—it can be squeezed sufficiently to distort it so that the pins of its hinge mechanism pop out of their sockets, freeing the panel from the frame. The replacement panel can then be inserted in the reverse manner; squeeze it, align its pins with their holes, and let it expand into place.

The cover of the invention has latch means for holding the cover panel closed. The latch means may take any suitable form, and could, for example, be comparable to a conventional door or gate latch, one part on an edge of the cover panel engaging with a second part on or in the frame, conveniently in that portion opposite the hinged edge. One preferred form of the latch means is the combination of a detent and a matching notched, toothed or headed pin, the pin projecting from the inside surface of the cover panel, at its edge, into a hole in the frame behind which is the detent to prevent it coming back out until the detent is withdrawn and the pin released. In another preferred form there is also utilized something like a pin/detent arrangement, but the other way around; projecting in from the panel is a seared pin which engages with a detent on/inside the frame, and can only be disengaged by physically pushing the pin (against its natural resilience) to one side until its sear clears the detent and so allows the panel to open. Examples of both of these are shown in the accompanying Drawings described hereinafter.

The invention's cover also has key-operated locking means enabling the cover panel to be secured, against opening, when in the closed position. The locking means, too, may take any convenient form, being for example a conventional mortise-type lock as found on cheap suitcases. However, it is particularly preferred that the locking means be combined with the latch means, and that the combination be a pin-and-detent latch (as just described above) where the only way to withdraw the detent and so release the pin, or to push the pin clear of the detente, and thus permit the cover to open, is by a key operation. And while the key might well be a conventional mortise-type key, its key-bit operatively engaging with a bolt-like detent (say), for use with the cover of the invention it is particularly advantageous to employ a rather different type of lock arrangement, wherein there is an elongate rod-like driver one end of which presses against the relevant part of the pin/detent arrangement. In one such type the rod-like driver presses against, and so withdraws, the detente, and has a seesaw-pivoted receptor beam at its other end, in a T-form, such that to move the driver both ends of the seesaw beam must be engaged at the same time, this being done using a two-pronged key the prongs of which are simultaneously inserted through corresponding keyhole apertures aligned with the beam's ends. Such a lock can be disposed for access from one side of the invention's cover, its parts—the detent and the seesaw-ended driver—being mounted within the frame and the two holes for the key's prongs being in the side surface of the frame and essentially invisible from the front.

In another such type—a seared pin/fixed detent version—there is not just a single pin/detent arrangement but rather a double one, spaced apart, necessitating a double rod-like driver that can press against, and so push aside both seared pins at the same time (this makes it less likely that a young, adventurous child with a knitting needle will be able to probe the cover until it opens!). Again, this requires a two-pronged key the spaced prongs of which are themselves the double rod-like driver and have to be simultaneously inserted through corresponding spaced keyhole apertures aligned with the pins. Moreover, to make it even harder for a child to operate improperly, the keyhole apertures can, just like some conventional UK 3-pin sockets, have a spring-loaded shutter on their inner side, which shutter must first be pushed aside by the key's prongs—or, preferably, by a third (central) prong dedicated to the purpose—before the prongs can reach further into the arrangement to "unlock" the panel.

In either case such a lock can be disposed for access from any "side"-top, bottom or left or right side—of the invention's cover, its parts being mounted within the frame and the two holes for the key's prongs being in the side surface of the frame and essentially invisible from the front. The keyholes are most preferably outlined in luminous paint so that they show up in the dark, and where the frame is particularly slim it may be necessary to angle the holes and the internal parts such that the key can be inserted in a direction angled towards the wall in which the socket is mounted. Examples of such locking systems are shown in the accompanying Drawings.

Embodiments of the invention are now described, though by way of illustration only, with reference to the accompanying diagrammatic Drawings in which:

BRIEF DESCRIPTION OF THE SEVERAL VIEWS OF THE DRAWINGS

FIGS. 6A & B show perspective views of the cover frame (of FIG. 5) and of the cover panel separate therefrom;

FIGS. 12A & B, show perspective views of an alternative cover design, in both closed and open states.

DETAILED DESCRIPTION

Figure 1:
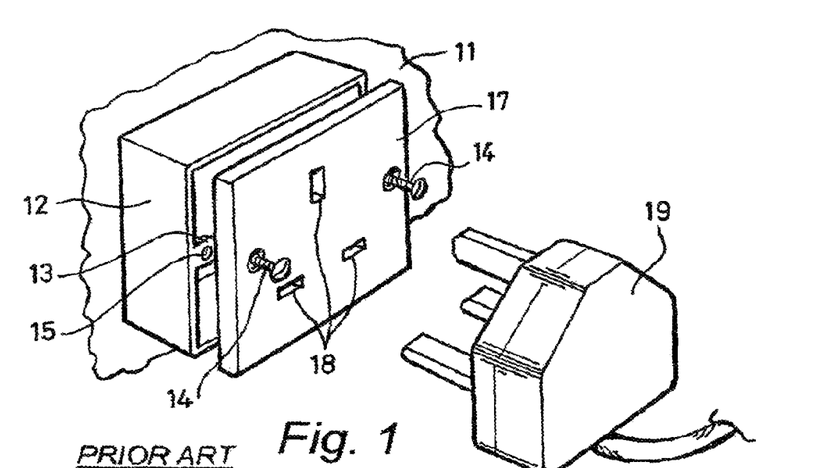
FIG. 1 shows an "exploded" perspective view of a conventional electric plug, socket box and plate mounted in a wall.
Figure 2A:
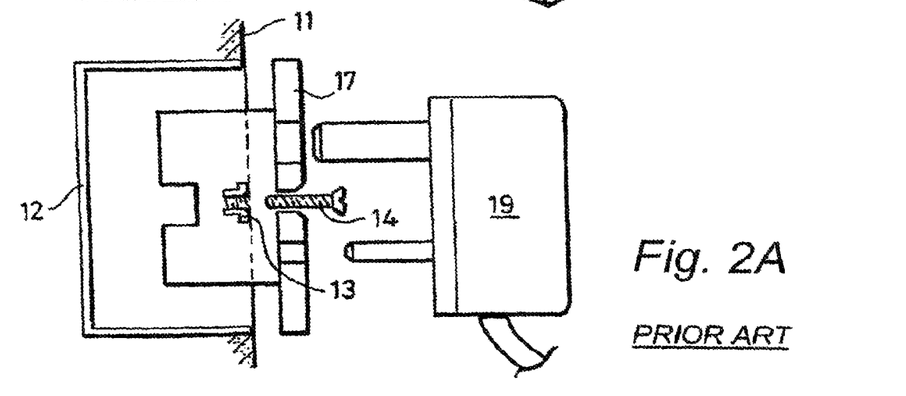
FIGS. 2A & B side views, partially in see-through, of the plug/box combination of FIG. 1, first "exploded" and then together.
Figure 2B:
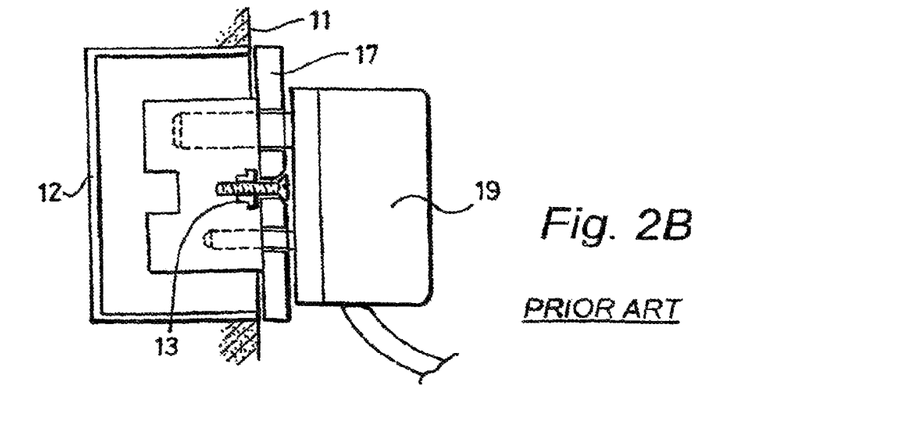

The plug/socket combination shown in FIGS. 1 and 2 is quite conventional (to avoid confusing complexity, the Figures do not show any of the wires leading to the socket, nor do they show the details of the internal structure of the terminals). Mounted in a hole in the wall (11) is a metal socket box (12) with an inwardly directed front flange (13) onto which is affixed, by screw-headed bolts (14) engaging with threaded holes (15), the socket plate (17). The socket plate 17 contains the usual plug pin holes (18: earth/ground, live, neutral) into which fit the pins of the plug (19).

Figure 3A:
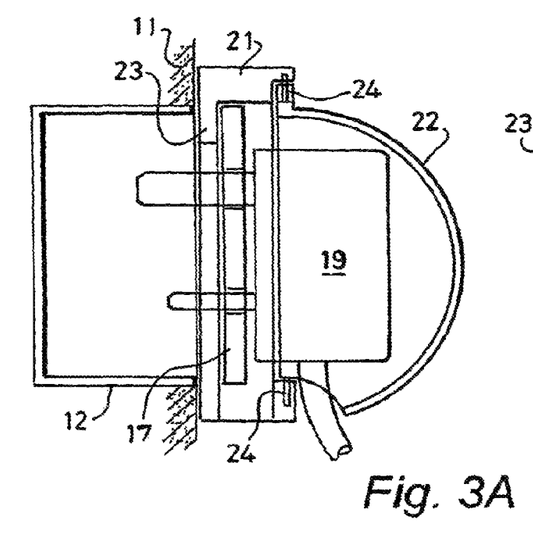
FIGS. 3A & B show side views, like that of FIG. 2B, with a cover of the invention in place, and of the cover alone.
Figure 3B:
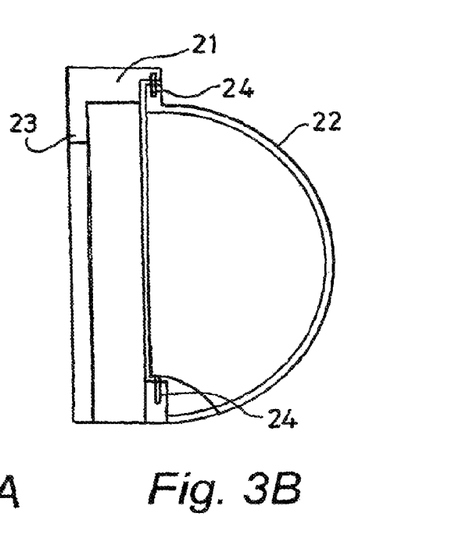
Figure 4A:
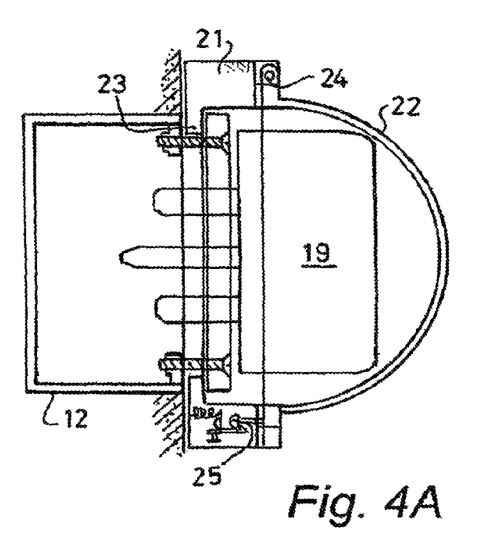
FIGS. 4A & B show top plan views corresponding to those of FIGS. 3A & B, with the cover of the invention in place, and of the cover alone.
Figure 4B:
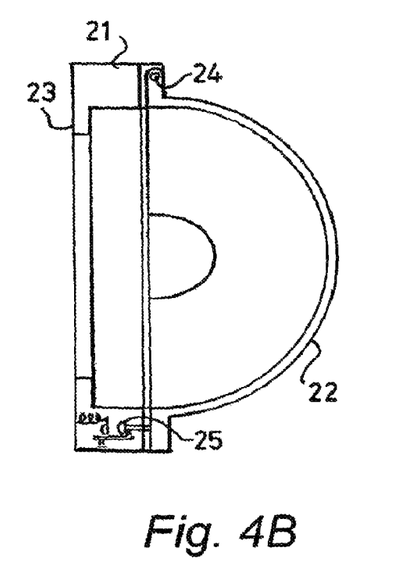
Figure 5:
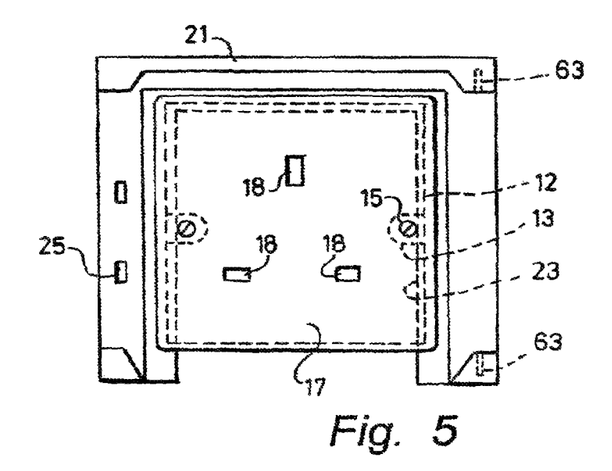
FIG. 5 shows a front elevation of the frame of a cover of the invention in place on a socket, but without the cover panel itself.

FIGS. 3 and 4 show the cover of the invention—both on its own (FIGS. 3B,4B) and in place over a socket/plug combination (FIGS. 3A,4A). The socket/plug combination is effectively the same as that shown in FIG. 2B). Details of the cover can perhaps more clearly be seen in FIGS. 5 and 6.

Briefly, the cover of the invention is the combination of a frame (21) and a lockable domed cover panel (22). The frame is mountable to the wall 11 around, and extending behind, the socket plate 17, and thus between the plate 17 and the socket box 12; for this purpose it has a lip (23) that fits behind the plate 17 and is gripped between the plate and the box flange 13 when the plate is screwed into place.

When in place, the cover panel 22 shrouds the plug 19 and the socket-aperture 18 (not separately shown in FIG. 3). The panel is hingedly secured (by a hinge pin/socket arrangement [24]), like a door to the frame, and is swingable between a closed position, where it completely covers and encloses the socket and any plug therein, and an open position, where it is clear therefrom, allowing access thereto. The hinged mechanism is biased (in a manner not shown here) so that when the panel latch is released the panel will spring open by itself.

In the embodiment shown, the frame 21 is quite bulky, and on the side distant from the hinge pin/socket 24 contains therewithin part of the latch means (25; and see FIG. 7) for holding the cover panel 22 closed. As is described hereinafter, the latch means 25 incorporate key-operated locking means enabling the cover panel 22 to be secured, against opening, when in the closed position.

Figures 6A, 6B:
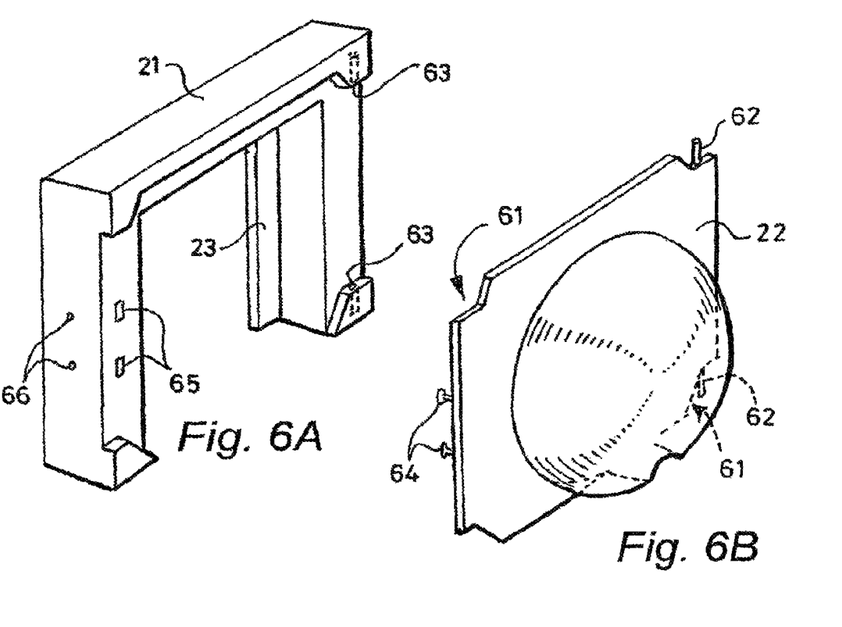

As will be clear from FIG. 6, the frame 21 and the cover panel 22 are shaped (especially at the corners [61]) to fit one to the other so as to form a flush front surface that has no protruding edges for a child's finger nails to get under in an attempt to prise the two apart. As can also perhaps best be seen from FIG. 6, the cover panel 22 has at one side edge top and bottom hinge pins (62) that fit into corresponding hinge-pin holes (63) in the outwardly-projecting portion of the front surface of the frame. And at the other side edge the panel has projecting latch pins (64) that pass into the frame 21 via corresponding latch holes (65) to engage with internal latching means (see FIG. 7) until released therefrom when the double-pronged key to the associated locking mechanism is inserted into the two keyholes (66) in the side of the frame.

Figure 7:
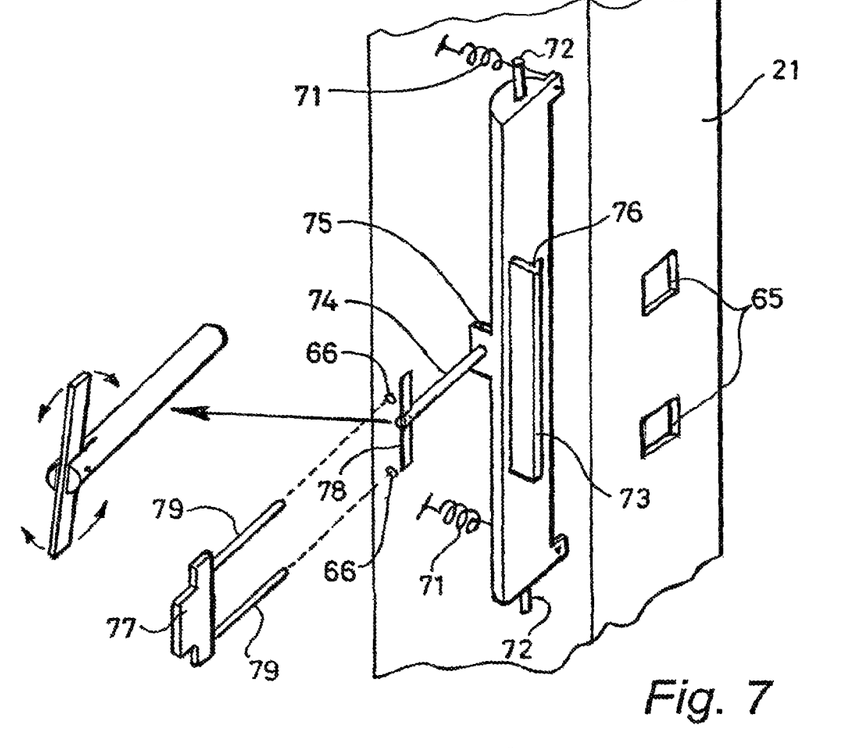
FIGS. 7 & 8 show details of a locking mechanism for use with a cover of the invention.
Figure 8:
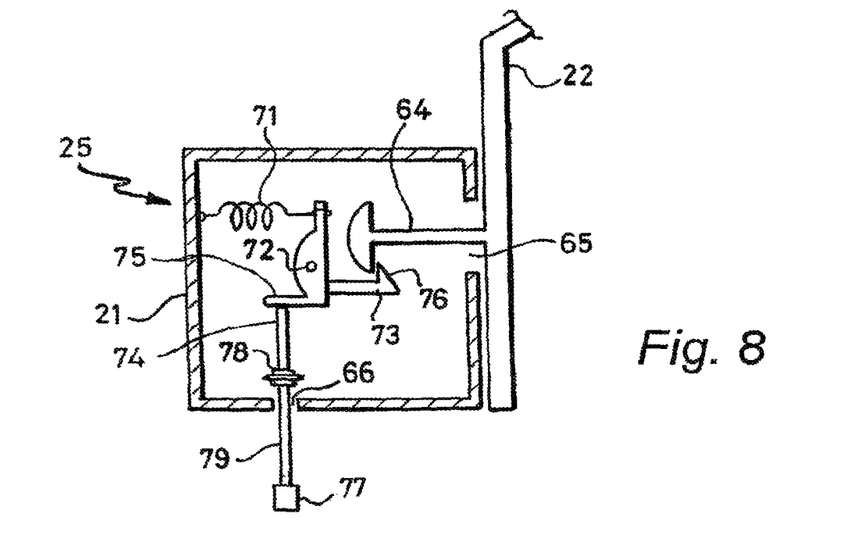

FIGS. 7 and 8 show details of one form of latching and locking system.

The frame 21 has in it a pair of latch holes 65 (in the front surface) and a pair of keyholes 66 (in the side surface). The frame is hollow, and inside it there is mounted (by means not fully shown, but including pivot pins [71] and a spring-bias [72])—adjacent and aligned to the latch holes 65, a latch-pin detent (73) with a sear (76). The detent may be pushed back, against the bias 71, by a T-bar plunger pin (74: the mounting for this is not shown) bearing against the short lip (75) protruding from the detente's base.

As will be clear (from FIG. 4, as well), when the cover panel 22 is shut the latch pins 25/64 projecting for near the edge of the panel pass through the latch holes 65 in the frame and engage with the detent 73, thus being prevented from pulling back (and thus the panel is kept closed). However, if the plunger pin 74 is pushed in onto the lip 75, so forcing the detent to rotate against the bias 71, and thereby moving the sear of the detent away from the latch-pin end and thus releasing the latch-pin (and so releasing the cover panel, and allowing it to spring open).

The combination of the bias 71 and the detent 73 locks the cover panel 22 closed. The plunger pin 74 will cause the detent to withdraw, and so release—unlock—the panel once actuated. However, to actuate the plunger pin the key (77) must be inserted into the side of the frame 21 by way of the keyholes 66. And to make it essentially impossible for such actuation to be effected using a common or garden implement like a sewing pin, or a knitting needle, the T-bar plunger pin 74 is given a pivotable top-bar (78), and the keyholes 66 are offset so that they align with one or other side of this bar, as a result, if a single pin-like object is pushed into either keyhole 66 all that happens is that the bar is pivoted down, like a seesaw, but the plunger does not operate to withdraw the detente.

The proper key 77 has two spaced prong-like operating members (79); these fit simultaneously into the two correspondingly-spaced keyholes 66, and so push both arms of the seesaw bar 78 together. As a result, the plunger 74 moves in against the bias 71 to withdraw the detent' 73, and the cover panel 22 springs open, as required.

Figure 9A:
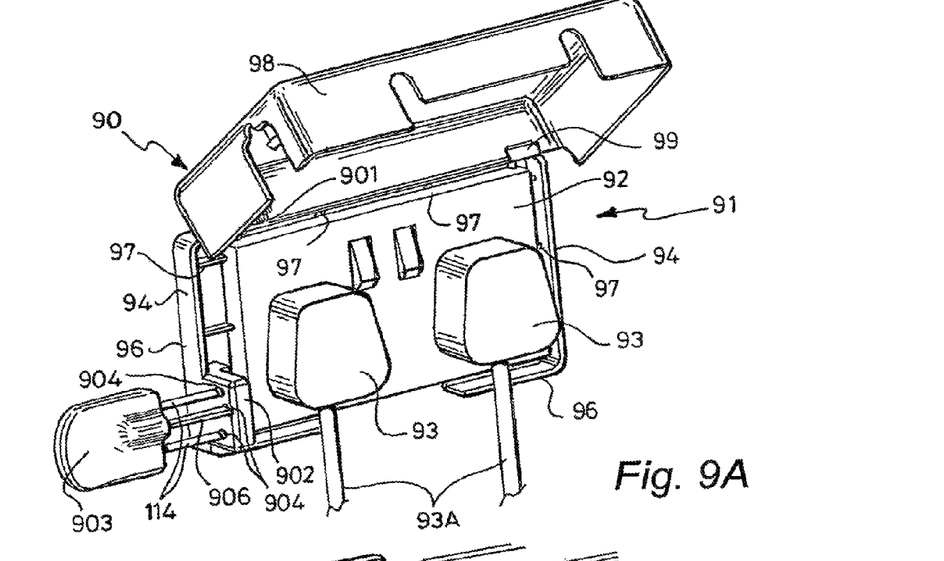
FIGS. 9A & B show details of a double socket cover of the invention, with its locking mechanism.
Figure 9B:
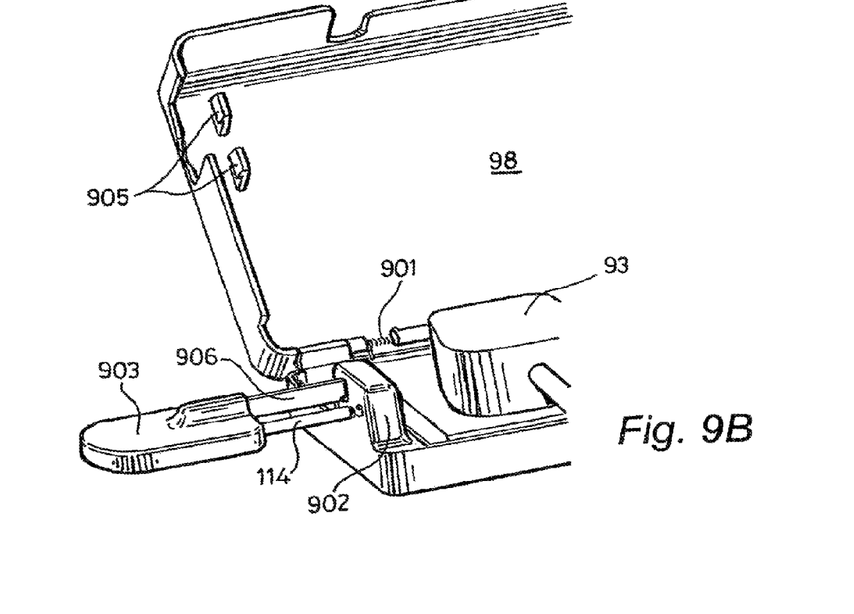
Figure 10A:
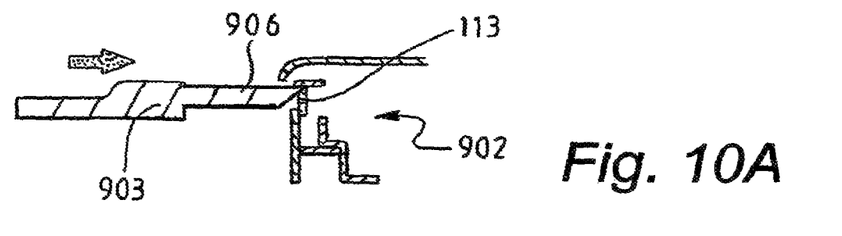
FIGS. 10A-D show details of the locking mechanism used in the cover of FIGS. 9A & B.
Figure 10B:
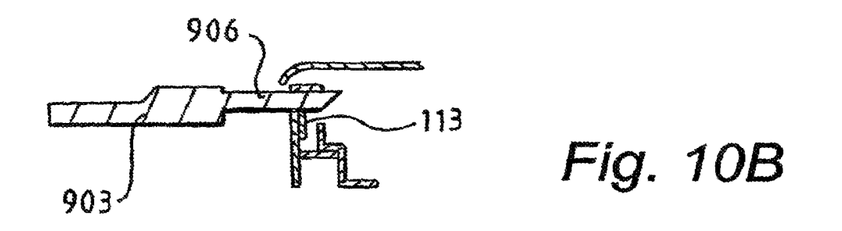
Figure 10C:
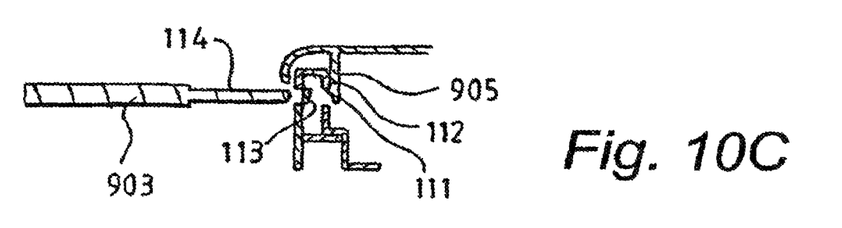
Figure 10D:
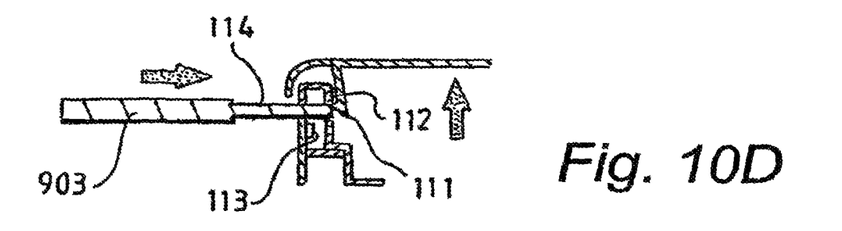

FIGS. 9A & B show details of a double socket cover (generally 90) of the invention, with its locking mechanism.

The double socket (generally 91), which is a switched socket, has a socket plate (92) bearing two sets of socket holes (not visible) in each of which is a standard plug (as 93) with its attached cable (as 93A), and is mounted (by screw-headed bolts, not shown) on a socket box (not visible) itself mounted in a recess in the wall (not shown). Surrounding the socket plate 92 is the frame (94) of the cover. The frame has an inwardly-directed lip (not visible) which is trapped behind the plate 92, between the plate and the socket box/wall, and so is retained thereby, and cannot be removed without first loosening off the plate-mounting bolts. The frame has an upstanding wall (96), which is apertured to allow the plug cables 93A to pass therethrough, and is a snug fit to the plate 92 by reason of the web portions (97) around the inner surface of the wall.

The cover has a socket/plug-shrouding cover panel (98) hinged by a pin/socket mechanism (99) to the upper (as viewed) edge of the socket plate 92. The hinged is sprung (901: best seen in FIG. 9B) to be biased open.

Outstanding from the left (as viewed) portion of the frame's perimeter wall 96 is a lock mechanism (902) into which a three-pronged key device (903) can be inserted via a suitably-shaped apertures (as 904). The mechanism 902, shown in section in FIGS. 10A-D, co-operates with two barbed detents (as 905) depending from the underside of the cover panel 98; the operation of these is shown in FIG. 10.

The sections of FIG. 10 show how the detents 905 hold the cover panel 98 shut, against the bias of the sprung hinge 901, until the key 903 is used to release it. First, the detents' barbs (111) hook under an inner lip (112) (see FIG. 10C). Then, as the key device 903 is inserted into the locking mechanism's apertures 904 the centre, longer prong (906) force down a spring-loaded sliding shutter (113) previously blocking all the apertures 904, and so revealing the mechanism per se. As the key penetrates further so the two side prongs (as 114) move on through the now unguarded gap into contact with the tip of the barbed detents (905, 111), and push them away from the lip 112, thus allowing the bias to drive open the cover panel 98.

If the key 903 is then removed, then, when the panel 98 is pushed shut, the detents 111 click into place under the lip 112, and the panel is held securely closed. The sliding shutter 113 then slides shut, blocking off the keyhole apertures 904.

Figure 11A:
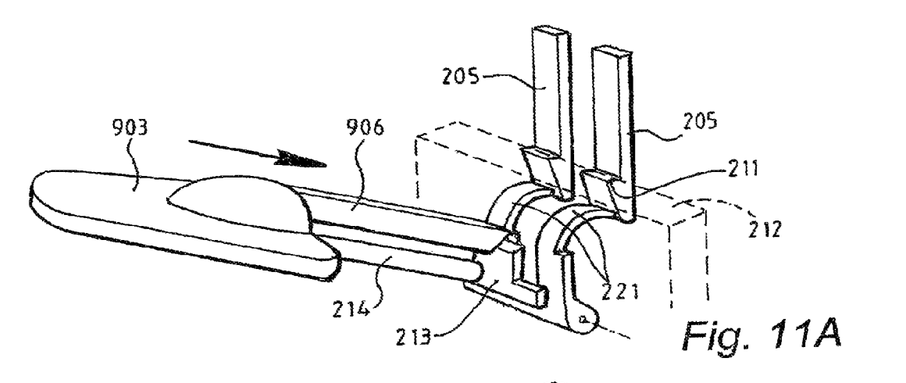
FIGS. 11A-C show details of an alternative locking mechanism for use in a cover like that of FIGS. 9A & B.
Figure 11B:
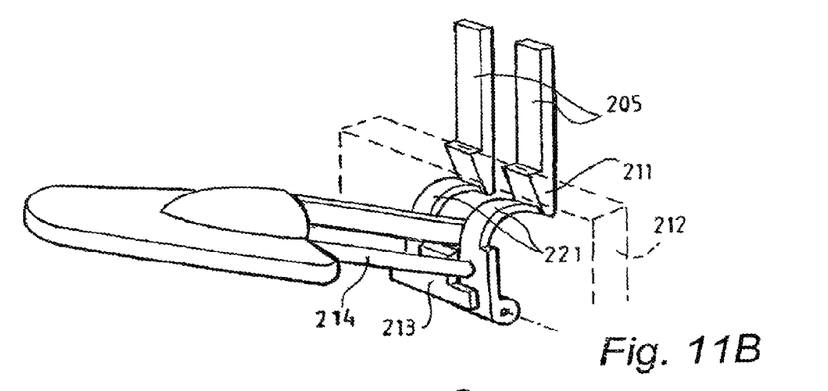
Figure 11C:
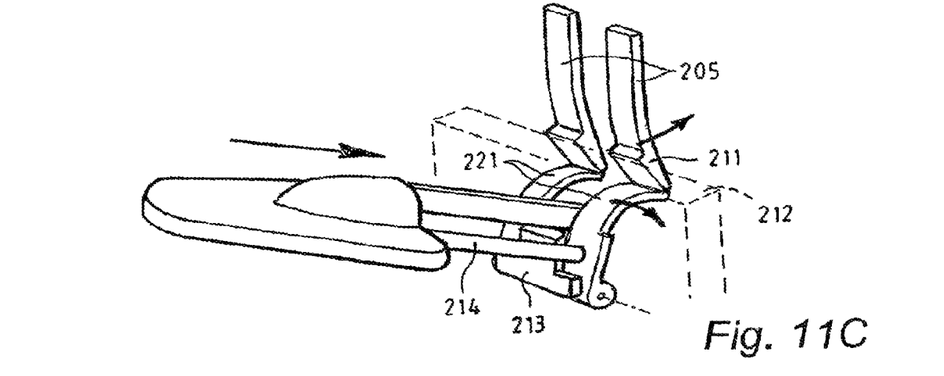

FIGS. 11A-C show details of an alternative locking mechanism for use in a cover like that of FIGS. 9A & B.

The three parts FIG. 11 show how the detents 205 hold the cover panel shut, against the bias of the sprung hinge, until the key 903 is used to release it. First—FIG. 11A—the detents' barbs (211) hook under an inner lip (212). Then, as the key device 903 is inserted (at a slightly "downwards" angle, as viewed) into the locking mechanism's apertures the centre, longer prong (906) force down a spring-loaded sliding shutter (213) previously blocking all the apertures (not shown separately here), and so revealing the mechanism per se. As the key penetrates further—FIG. 11B—SO the two side prongs (as 214) move on through the now unguarded gap into contact with the tip of the barbed detents (205, 211), and—FIG. 11C—push them away from the lip 212, thus allowing the bias to drive open the cover panel 98.

Though not shown here, the two detents 205 are independent, and biased to the lip-engage position, so even if one of them is pushed all the way back the other still engages the lip 212, and keeps the cover shut.

If the key 903 is then removed, then, when the panel is pushed shut, the detents 211 click into place under the lip 212, and the panel is held securely closed. The sliding shutter 213 then slides shut, blocking off the keyhole apertures.

Figures 12A, 12B:
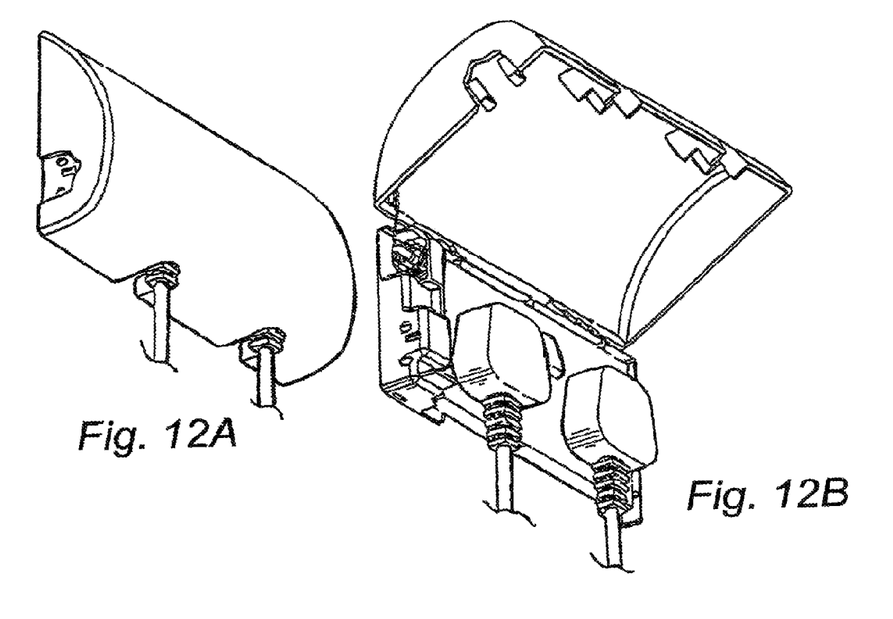

FIGS. 12A,B show an alternative cover design, in both closed and open states. Though visually somewhat different, conceptually it is much like the design of the previous Figures—and particularly that of FIGS. 9A,B—and needs no further description at this time.

Figure 13:
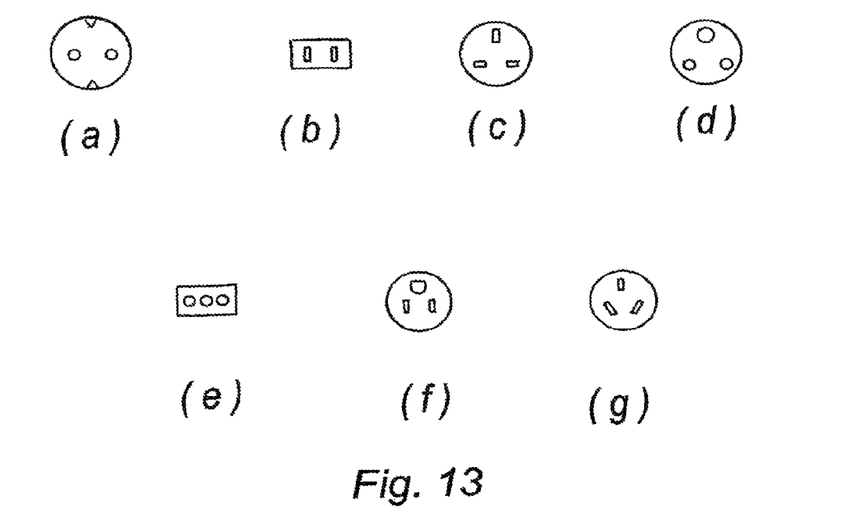
FIG. 13 shows a selection of socket/plug types used around the world.

FIG. 13 shows a selection of socket/plug aperture/pin layouts as used around the world.

The separate Figures show, in this order:
 a) the 2-round-pin recessed devices used over most of continental Europe and Russia;
 b) the 2-flat-strip US ones;
 c) the present-day UK "triangle" 3-square-pin ones;
 d) the triangle 3-round-pin Indian ones;
 e) the 3-in-a-line-round-pin Italian ones;
 f) the triangle 2-strip-one-round Japanese ones;
 g) the proud triangle 3-angled-strip-pin sockets used in Argentina, Australia and China.

The invention claimed is:

1. A method of connecting and using a safety cover for a socket including a front plate connected to a rear box using one or more screw-headed bolts, comprising the steps of:
 loosening, but not removing, the one or more screw-headed bolts connecting the front plate to the rear box;
 moving the front plate outward away from the rear box so that a frame included with the safety cover can be slid onto the front plate;
 sliding the frame onto the front plate so that a lip included with the frame is disposed between the front plate and the rear box; and
 tightening the one or more screw-headed bolts so that the front plate is connected to the rear box with the lip from the frame gripped between the front plate and the rear box;
 wherein
 the frame is U-shaped and includes an upper portion and two side portions, the upper portion and two side portions forming a plate opening sized so that the front plate may be disposed therein; and
 the lip is disposed within the plate opening adjacent to a rear portion of the frame and extends inward with respect to the frame from the upper portion and two side portions.

2. The method of claim 1, wherein:
 the step of sliding the frame includes the step of sliding the frame downward onto the front plate so that the lip is disposed between three edges of the front plate and the rear box; and
 the step of tightening the one or more screw-headed bolts including the step of tightening the one or more screw-headed bolts so that the lip is gripped between the three edges of the front plate and the rear box.

3. The method of claim 2, wherein:
 the safety cover includes a recess defined in a front portion of the frame and a cover panel hingedly secured like a door to the frame, the cover panel including a pair of latch pins or barbed indents and being swingable from a closed position and an open position, the cover panel being biased to spring open when released from the closed position and sized to be disposed within the recess when the cover panel is in the closed position; and
 the method further includes the step of closing the cover panel so that the socket is covered by and enclosed by the safety cover, the cover panel and the frame forming a flush front surface that has no protruding edges when the cover panel is in the closed position.

4. The method of claim 3, wherein:
the safety cover includes a latch means disposed within the frame for holding the cover panel in the closed position; and
the step of closing the cover panel includes the step of engaging the latch means with the pair of latch pins or barbed detents when the cover panel is in the closed position.

5. The method of claim 4, wherein:
the frame includes keyholes and the safety cover includes a key having at least two side prongs; and
the method further includes the step of inserting the at least two side prongs of the key through the keyholes to disengage the latch means from the pair of latch pins or barbed detents and release the cover panel.

6. The method of claim 5, wherein:
the latch means includes an inner lip that engages with the pair of latch pins or barbed detents when the cover panel is in the closed position; and
the at least two side prongs engage with and move the latch pins or barbed detents away from engagement with the inner lip when the at least two side prongs are inserted through the keyholes.

7. The method of claim 6, wherein the latch pins or barbed detents operate independently and when only one of the latch pins or barbed detents is moved away from engagement with the inner lip, the other barbed detent remains engaged with the inner lip.

8. The method of claim 7, wherein:
the safety cover includes a shutter covering the keyholes in the frame when the cover is closed;
the key further includes a center prong, the center prong having a center prong length and the two side prongs having a side prong length that is less than the center prong length; and
the method further includes the step of inserting the center prong through the keyholes to displace the shutter so that the side prongs of the key can be inserted through the keyholes to disengage the latch means from the pair of latch pins or barbed detents and release the cover panel.

9. A method of connecting a safety cover to a socket including a front plate connected to a rear box using one or more screw-headed bolts, comprising the steps of:
loosening, but not removing, the one or more screw-headed bolts connecting the front plate to the rear box;
moving the front plate outward away from the rear box so that a frame included with the safety cover can be slid onto the front plate, the frame being u-shaped and including an upper portion and two side portions, the upper portion and two side portions forming a plate opening sized so that the front plate may be disposed therein;
sliding the frame onto the front plate so that a lip included with the frame is disposed between the front plate and the rear box, the lip extending inward with respect to the frame from an inner surface of a rear portion of the upper portion and two side portions forming the plate opening;
tightening the one or more screw-headed bolts so that the front plate is connected to the rear box with the lip from the frame gripped between the front plate and the rear box; and
closing a cover panel included with the safety cover and hingedly connected to the frame like a door so that the socket is covered by and enclosed by the safety cover, the cover panel and the frame forming a flush front surface that has no protruding edges when the cover panel is in the closed position.

10. The method of claim 9, wherein the frame further includes keyholes defined in a side surface of one of the two side portions and latch pin openings defined in a front surface of one of the two side portions, the latch pin openings and the keyholes being defined in the same side portion.

11. The method of claim 10, wherein the frame includes a recess defined in a front surface of the upper portion and two side portions and hinge pin holes defined in an upper portion and lower portion of one of the two side portions, the hinge pin holes and the keyholes being defined in different side portions.

12. The method of claim 11, wherein the cover panel is sized to fit the recess defined in the upper portion and two side portions, is rectangular in shape, and includes notched corners and a central domed portion.

13. The method of claim 12, wherein the cover panel includes hinge pins extending vertically outward from two of the notched corners and latch pins extending horizontally outward from an inner surface of the cover panel midway between two of the notched corners, the latch pins and hinge pins being located on opposite edges of the cover panel, the hinge pins being disposed within the hinge pin openings defined in the frame.

14. The method of claim 13, wherein:
the frame includes a latch means disposed within the frame adjacent to the keyholes and the latch pin openings; and
the step of closing the cover panel includes the step of closing the cover panel so that the latch pins included with the cover panel pass through the latch pin openings defined in the frame and engage with the latch means.

15. A method of connecting a safety cover to a socket including a front plate connected to a rear box using one or more screw-headed bolts, comprising the steps of:
loosening, but not removing, the one or more screw-headed bolts connecting the front plate to the rear box;
moving the front plate outward away from the rear box so that a frame included with the safety cover can be slid onto the front plate, the frame being u-shaped and including an upper portion and two side portions, the upper portion and two side portions forming a plate opening sized so that the front plate may be disposed therein;
sliding the frame onto the front plate so that a lip included with the frame is disposed between the front plate and the rear box, the lip extending inward from an inner surface of a rear portion of the upper portion and two side portions forming the plate opening; and
tightening the one or more screw-headed bolts so that the front plate is connected to the rear box with the lip from the frame gripped between the front plate and the rear box.

16. The method of claim 15, wherein the frame includes keyholes defined in a side surface of one of the two side portions and latch pin openings defined in a front surface of one of the two side portions, the latch pin openings and the keyholes being defined in the same side portion.

17. The method of claim 16, wherein the frame includes a recess defined in a front surface of the upper and two side portions and hinge pin holes defined in an upper and lower portion of one of the two side portions, the hinge pin holes and the keyholes being defined in different side portions.

18. The method of claim 17, wherein the safety cover includes a cover panel hingedly connected to the frame like a door, the cover panel sized to fit the recess defined in the upper and two side portions, having a rectangular shape, and including notched corners and a central domed portion.

19. The method of claim 18, wherein the cover panel includes hinge pins extending vertically outward from two of the notched corners and latch pins extending horizontally outward from an inner surface of the cover panel midway between two of the notched corners, the latch pins and hinge pins being located on opposite edges of the cover panel, the hinge pins being disposed within the hinge pin openings defined in the frame.

* * * * *